United States Patent
Kadono

(10) Patent No.: US 6,772,038 B2
(45) Date of Patent: Aug. 3, 2004

(54) MACHINING-RELATED INFORMATION GENERATING APPARATUS AND NUMERICAL CONTROLLER HAVING THE SAME

(75) Inventor: Mitsuhiko Kadono, Yamatokoriyama (JP)

(73) Assignees: Mori Seiki Co., Ltd., Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 113 days.

(21) Appl. No.: 10/011,314

(22) Filed: Dec. 11, 2001

(65) Prior Publication Data

US 2002/0082742 A1 Jun. 27, 2002

(30) Foreign Application Priority Data

Dec. 22, 2000 (JP) ........................................ 2000-390111

(51) Int. Cl.⁷ .............................................. G06F 19/00
(52) U.S. Cl. ...................... 700/159; 700/175; 700/182; 700/184
(58) Field of Search ................................ 700/159, 175, 700/182, 184

(56) References Cited

U.S. PATENT DOCUMENTS 4,789,931 A * 12/1988 Kuragano et al. .......... 700/176
6,161,055 A * 12/2000 Pryor ........................... 700/175
6,535,788 B1 * 3/2003 Yoshida et al. ............. 700/191

FOREIGN PATENT DOCUMENTS

| JP | 10-034496 | 2/1998 |
| JP | 11-165239 | 6/1999 |
| JP | 11-175124 | 7/1999 |

* cited by examiner

*Primary Examiner*—Leo Picard
*Assistant Examiner*—Charles Kasenge
(74) *Attorney, Agent, or Firm*—Westerman, Hattori, Daniels & Adrian, LLP

(57) ABSTRACT

The present invention provides a machining-related information generating apparatus, which speedily and correctly generates tool path data, and automatically generates operation information required for machining. The machining-related information generating apparatus comprises: a process/machining model data generating section (5) which extracts product characteristic data from CAD data, then generates process data, stock blank data and machining model data; a machining-related information generating section (10) which generates tool path data on the basis of the process data, the stock blank data, the machining model data and the like, then generates data of virtual workpiece configurations, and generates machining operation information data on the basis of the process data, the stock blank data, the tool path data and the virtual workpiece configuration data.

4 Claims, 16 Drawing Sheets

FIG. 9
| OPERATION NUMBER 00001(FLAT PORTION ROUGH MACHINING) 00002(POCKET ROUGH MACHINING 1),00002(POCKET ROUGH MACHINING 2) ||||||
|---|---|---|---|---|---|
| PRE-MACHINING CONFIGURATION |||  POST-MACHINING CONFIGURATION |||
|  ||| 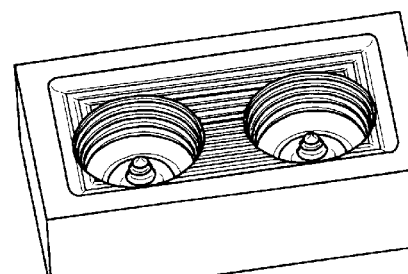 |||
| TOOL NUMBER | ** | OFFSET NUMBER |  | COLLET | ** |
| HOLDER | **** | CUTTING TOOL | **** | EXTENSION | **** |
| MAKER | **** | MAKER | **** | MAKER | **** |
| 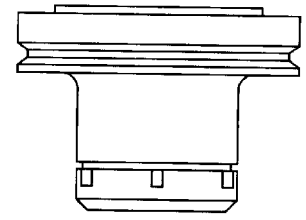 ||  || 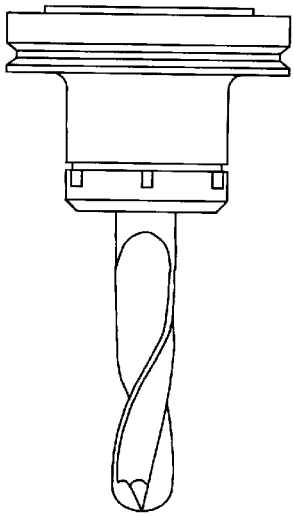 ||
| | | TOOL DIAMETER | 20mm | | |
| | | OVERALL LENGTH | 100mm | | |
| | | TOOTH LENGTH | 24mm | | |
| | | SHANK DIAMETER | 20mm | | |
| | | NUMBER OF TEETH | 2 | TOOL LENGTH | 50mm |

FIG. 10
| OPERATION NUMBER 00004 (SEMI-FINISH MACHINING) ||||
|---|---|---|---|
| PRE-MACHINING CONFIGURATION |||  POST-MACHINING CONFIGURATION |
| 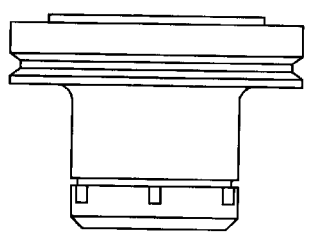 |||  |
| TOOL NUMBER | ** | OFFSET NUMBER |  | COLLET | ** |
|---|---|---|---|---|---|
| HOLDER | **** | CUTTING TOOL | **** | EXTENSION | **** |
| MAKER | **** | MAKER | **** | MAKER | **** |
| TOOL DIAMETER | 20mm |
|---|---|
| OVERALL LENGTH | 100mm |
| TOOTH LENGTH | 24mm |
| SHANK DIAMETER | 20mm |
| NUMBER OF TEETH | 2 |
| TOOL LENGTH | 50mm |
|---|---|
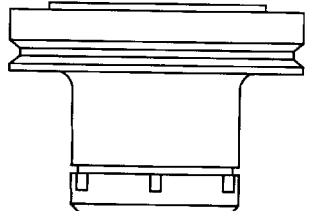

FIG. 11
| OPERATION NUMBER 00005 (FINISH MACHINING) |||||||
|---|---|---|---|---|---|---|
| PRE-MACHINING CONFIGURATION ||| POST-MACHINING CONFIGURATION |||||
| 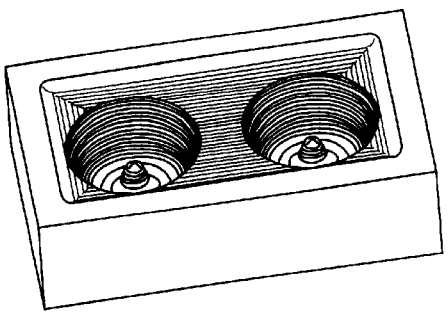 ||| 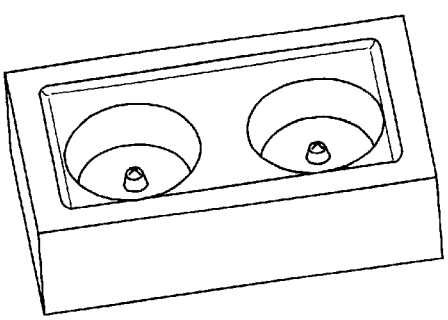 |||||
| TOOL NUMBER | ** | OFFSET NUMBER |  | COLLET | ** |
| HOLDER | **** | CUTTING TOOL | **** | EXTENSION | **** |
| MAKER | **** | MAKER | **** | MAKER | **** |
| 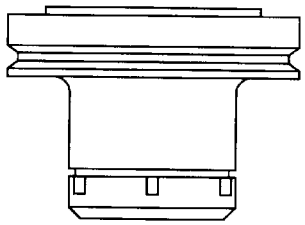 ||  || 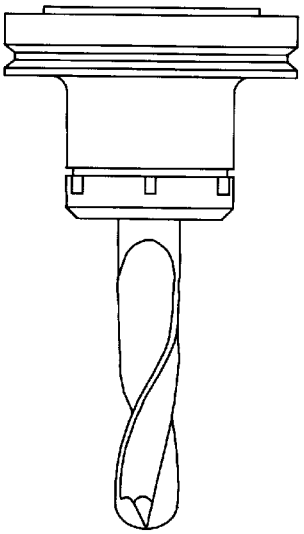 ||
| | | TOOL DIAMETER | 20mm | | |
| | | OVERALL LENGTH | 100mm | | |
| | | TOOTH LENGTH | 24mm | | |
| | | SHANK DIAMETER | 20mm | | |
| | | NUMBER OF TEETH | 2 | TOOL LENGTH | 50mm |

FIG. 12

| MACHINING OPERATION NUMBER | 00001 (FLAT PORTION ROUGH MACHINING) |
|---|---|
| TOOL PATH TYPE | CONTOUR LINE MACHINING |
| TYPE OF AREA | CLOSED AREA |

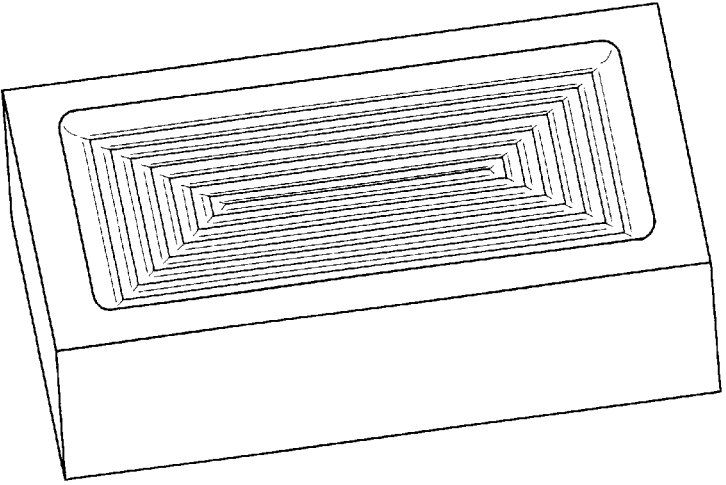

| TOOL NUMBER | T0001 | OFFSET NUMBER | H0001 |
|---|---|---|---|
| TOOL DIAMETER | 20mm | TOOL LENGTH | 50mm |
| SPINDLE ROTATION SPEED | S2000 | FEED RATE | F1000 |
| DEPTH OF AXIAL CUT | 1mm | DEPTH OF RADIAL CUT | 1mm |
| X-Y PITCH | 0 | Z-PITCH | 2mm |
| TYPE OF APPROACH | ARC | APPROACH FEED RATE | F500 |
| TYPE OF ESCAPE | ARC | ESCAPE FEED RATE | F500 |
| TYPE OF CUTTING FLUID | | AIR BLOW | |
| CUTTING RESIDUE | 0.1mm | TOLERANCE | 0.005mm |
| ESTIMATED MACHINING TIME | | 0:5:10 | |
| CUTTING DISTANCE | 3125mm | REMOVAL VOLUME | 625cc |
| TOOL LIFE EXPECTANCY BY CUTTING DISTANCE | 3500mm | TOOL LIFE EXPECTANCY BY REMOVAL VOLUME | 750cc |
| NUMBER OF TIMES OF TOOTH CONTACT | | 20039 TIMES | |

FIG. 13

| MACHINING OPERATION NUMBER | 00002 (POCKET ROUGH MACHINING 1) |
|---|---|
| TOOL PATH TYPE | CONTOUR LINE MACHINING |
| TYPE OF AREA | CLOSED AREA |

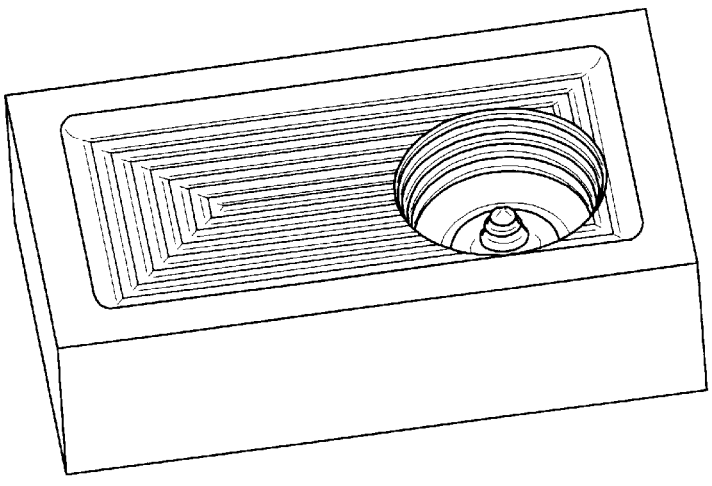

| TOOL NUMBER | T0001 | OFFSET NUMBER | H0001 |
|---|---|---|---|
| TOOL DIAMETER | 20mm | TOOL LENGTH | 50mm |
| SPINDLE ROTATION SPEED | S2000 | FEED RATE | F1000 |
| DEPTH OF AXIAL CUT | 1mm | DEPTH OF RADIAL CUT | 1mm |
| X-Y PITCH | 0 | Z-PITCH | 2mm |
| TYPE OF APPROACH | ARC | APPROACH FEED RATE | F500 |
| TYPE OF ESCAPE | ARC | ESCAPE FEED RATE | F500 |
| TYPE OF CUTTING FLUID | | AIR BLOW | |
| CUTTING RESIDUE | 0.1mm | TOLERANCE | 0.005mm |
| ESTIMATED MACHINING TIME | | 0:15:35 | |
| CUTTING DISTANCE | 3125mm | REMOVAL VOLUME | 625cc |
| TOOL LIFE EXPECTANCY BY CUTTING DISTANCE | 3500mm | TOOL LIFE EXPECTANCY BY REMOVAL VOLUME | 750cc |
| NUMBER OF TIMES OF TOOTH CONTACT | | 13749 TIMES | |

FIG. 14

| MACHINING OPERATION NUMBER | 00003 (POCKET ROUGH MACHINING 2) |
|---|---|
| TOOL PATH TYPE | CONTOUR LINE MACHINING |
| TYPE OF AREA | CLOSED AREA |

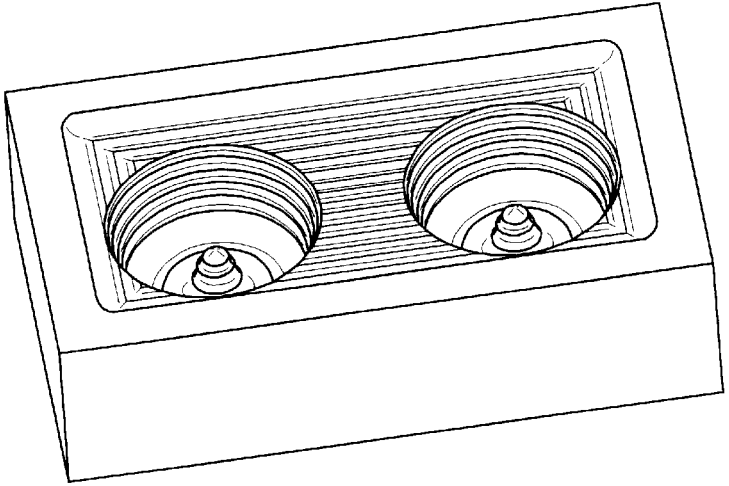

| TOOL NUMBER | T0001 | OFFSET NUMBER | H0001 |
|---|---|---|---|
| TOOL DIAMETER | 20mm | TOOL LENGTH | 50mm |
| SPINDLE ROTATION SPEED | S2000 | FEED RATE | F1000 |
| DEPTH OF AXIAL CUT | 1mm | DEPTH OF RADIAL CUT | 1mm |
| X-Y PITCH | 0 | Z-PITCH | 2mm |
| TYPE OF APPROACH | ARC | APPROACH FEED RATE | F500 |
| TYPE OF ESCAPE | ARC | ESCAPE FEED RATE | F500 |
| TYPE OF CUTTING FLUID | | AIR BLOW | |
| CUTTING RESIDUE | 0.1mm | TOLERANCE | 0.005mm |
| ESTIMATED MACHINING TIME | | 0:15:35 | |
| CUTTING DISTANCE | 3125mm | REMOVAL VOLUME | 625cc |
| TOOL LIFE EXPECTANCY BY CUTTING DISTANCE | 3500mm | TOOL LIFE EXPECTANCY BY REMOVAL VOLUME | 750cc |
| NUMBER OF TIMES OF TOOTH CONTACT | | 13749 TIMES | |

FIG. 15

| MACHINING OPERATION NUMBER | 00004 (SEMI-FINISH MACHINING) |
|---|---|
| TOOL PATH TYPE | CONTOUR LINE MACHINING |
| TYPE OF AREA | CLOSED AREA |

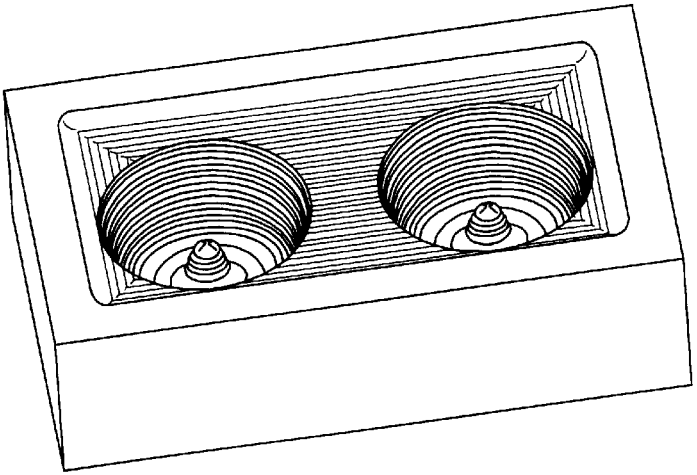

| TOOL NUMBER | T0002 | OFFSET NUMBER | H0002 |
|---|---|---|---|
| TOOL DIAMETER | 16mm | TOOL LENGTH | 50mm |
| SPINDLE ROTATION SPEED | S5000 | FEED RATE | F2000 |
| DEPTH OF AXIAL CUT | 0.5mm | DEPTH OF RADIAL CUT | 0.5mm |
| X-Y PITCH | 0 | Z-PITCH | 1mm |
| TYPE OF APPROACH | ARC | APPROACH FEED RATE | F500 |
| TYPE OF ESCAPE | ARC | ESCAPE FEED RATE | F500 |
| TYPE OF CUTTING FLUID | | AIR BLOW | |
| CUTTING RESIDUE | 0.1mm | TOLERANCE | 0.005mm |
| ESTIMATED MACHINING TIME | | 0:15:35 | |
| CUTTING DISTANCE | 3125mm | REMOVAL VOLUME | 95cc |
| TOOL LIFE EXPECTANCY BY CUTTING DISTANCE | 3500mm | TOOL LIFE EXPECTANCY BY REMOVAL VOLUME | 750cc |
| NUMBER OF TIMES OF TOOTH CONTACT | | 85236 TIMES | |

FIG. 16

| MACHINING OPERATION NUMBER | 00005 (FINISH MACHINING) |
|---|---|
| TOOL PATH TYPE | CONTOUR LINE MACHINING |
| TYPE OF AREA | CLOSED AREA |

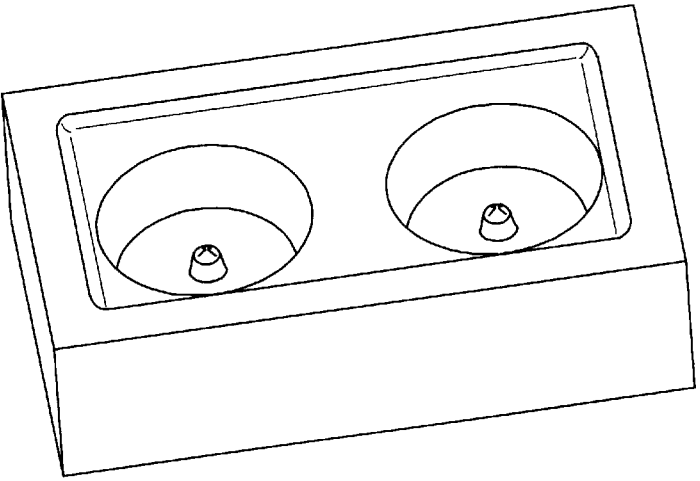

| TOOL NUMBER | T0003 | OFFSET NUMBER | H0003 |
|---|---|---|---|
| TOOL DIAMETER | 10mm | TOOL LENGTH | 50mm |
| SPINDLE ROTATION SPEED | S8000 | FEED RATE | F4000 |
| DEPTH OF AXIAL CUT | 0.1mm | DEPTH OF RADIAL CUT | 0.1mm |
| X-Y PITCH | 0 | Z-PITCH | 0.2mm |
| TYPE OF APPROACH | ARC | APPROACH FEED RATE | F500 |
| TYPE OF ESCAPE | ARC | ESCAPE FEED RATE | F500 |
| TYPE OF CUTTING FLUID | | AIR BLOW | |
| CUTTING RESIDUE | 0mm | TOLERANCE | 0.005mm |
| ESTIMATED MACHINING TIME | | 0:15:35 | |
| CUTTING DISTANCE | 3125mm | REMOVAL VOLUME | 55cc |
| TOOL LIFE EXPECTANCY BY CUTTING DISTANCE | 3500mm | TOOL LIFE EXPECTANCY BY REMOVAL VOLUME | 750cc |
| NUMBER OF TIMES OF TOOTH CONTACT | | 158674 TIMES | |

FIG. 17

| PRE-MACHINING (BLANK) CONFIGURATION | POST-MACHINING (FINAL) CONFIGURATION | | |
|---|---|---|---|
|  | 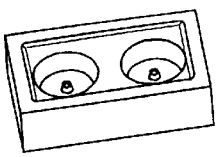 | MATERIAL | **** |
| | | TOTAL MACHINING TIME | 1:57:15 |
| | | STOCK BLANK | **** |
| | | EXPECTED SURFACE ROUGHNESS | **** |
| | | ACTUAL CUTTING DISTANCE | |
| | | NUMBER OF TIMES OF TOOL CONTACT | |
|  | 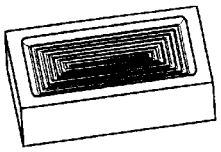 | TOOL | φ20mmBEM |
| | | MACHINING TIME | 0:5:10 |
| | | FLAT PORTION ROUGH MACHINING | |
| | | EXPECTED SURFACE ROUGHNESS | 100μm |
| | | ACTUAL CUTTING DISTANCE | 3125mm |
| | | NUMBER OF TIMES OF TOOL CONTACT | 20039 TIMES |
| 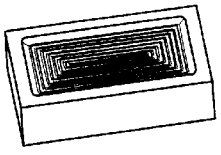 | 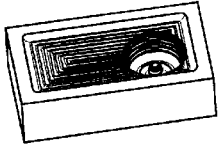 | TOOL | φ20mmBEM |
| | | MACHINING TIME | 0:15:35 |
| | | POCKET ROUGH MACHINING 1 | |
| | | EXPECTED SURFACE ROUGHNESS | 100μm |
| | | ACTUAL CUTTING DISTANCE | 3125mm |
| | | NUMBER OF TIMES OF TOOL CONTACT | 13749 TIMES |
| 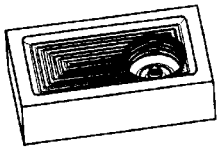 | 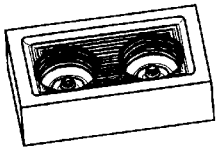 | TOOL | φ20mmBEM |
| | | MACHINING TIME | 0:15:35 |
| | | POCKET ROUGH MACHINING 2 | |
| | | EXPECTED SURFACE ROUGHNESS | 100μm |
| | | ACTUAL CUTTING DISTANCE | 3125mm |
| | | NUMBER OF TIMES OF TOOL CONTACT | 13749 TIMES |
| 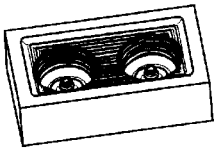 | 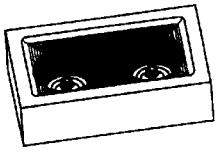 | TOOL | φ16mmBEM |
| | | MACHINING TIME | 0:30:35 |
| | | SEMI-FINISH MACHINING | |
| | | EXPECTED SURFACE ROUGHNESS | 10μm |
| | | ACTUAL CUTTING DISTANCE | 3125mm |
| | | NUMBER OF TIMES OF TOOL CONTACT | 85236 TIMES |
|  | 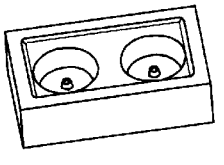 | TOOL | φ10mmBEM |
| | | MACHINING TIME | 0:50:20 |
| | | FINISH MACHINING | |
| | | EXPECTED SURFACE ROUGHNESS | 2μm |
| | | ACTUAL CUTTING DISTANCE | 3125mm |
| | | NUMBER OF TIMES OF TOOL CONTACT | 158674 TIMES |

MACHINING-RELATED INFORMATION GENERATING APPARATUS AND NUMERICAL CONTROLLER HAVING THE SAME

BACKGROUND OF THE INVENTION

1. Field of the Invention

The present invention relates to a machining-related information generating apparatus which automatically generates machining-related information including tool path data indicative of a tool traveling path and cutting conditions and other machining-related data to be used in an NC machine tool, and to a numerical controller having the machining-related information generating apparatus.

2. Description of the Prior Art

An apparatus for automatically generating tool path data has hitherto known, which employs a CAM (computer aided manufacturing) technique to generate the tool path data on the basis of product design data generated by CAD (computer aided design).

The design data generated by the CAD (hereinafter referred to as "CAD data") includes configuration data indicative of the final configuration and dimensions of a product to be obtained after machining (e.g., coordinates data and mathematical expression data), and data indicative of dimension lines. After extracting the product configuration data from the CAD data, the tool path data generating apparatus receives data required for the generation of the tool path data, for example, data of configurational characteristics of the product indicative of whether the product has a round portion, a rectangular portion, a cylindrical portion, a prismatic portion, a convex surface or a concave surface and data of machining methods indicative of to-be-used tools and cutting conditions, which are inputted from an input device by an operator. The tool path data generating apparatus generates the tool path data on the basis of the inputted data and the configuration data extracted from the CAD data.

However, the conventional tool path data generating apparatus is designed so that the operator inputs the data of the product configurational characteristics and the data of the machining methods required for the generation of the tool path data, thereby requiring much time for the data input and hence for the machining of the product. In addition, it is difficult to perfectly prevent human errors in the data input, resulting in production of defective products or damages to jigs and tools. This is a serious problem particularly in the case of machining for production of a uniquely customized product such as a mold.

Where an NC machining program is generated on the basis of the tool path data generated by the tool path data generating apparatus and a machining operation is performed on the basis of the NC machining program by an NC machine tool, the NC machine tool may fail to provides an expected result due to chattering of the tools and an overload during the machining. In such a case, it is necessary to perform time-consuming trouble-shooting and then correct the NC machining program. For the correction of the NC machining program, the tool path data generating process should retrospectively be performed from the initial stage thereof by the tool path data generating apparatus. This requires much time before outputting NC machining program again, thereby reducing the productivity with much downtime of the machine tool.

In the conventional tool path data generating apparatus, the data of the to-be-used tools and the cutting conditions for the generation of the tool path data is inputted by the operator as described above. Therefore, the inputting operator has to preliminarily determine the types of the tools and tool holders to be used and machining conditions such as tool settings (e.g., tool length), and a machining operator has to prepare the tools according to the machining conditions determined by the inputting operator when actually performing a machining operation. To this end, the inputting operator conventionally formulates a worksheet prescribing the machining conditions (machining operation information).

However, the formulation of the worksheet requires much time, and it is preferred to streamline the worksheet formulating operation as much as possible to save the machining time. Particularly in the case of the machining for the production of the uniquely customized product (e.g., mold) which often entails a great machining loss, it is desirable to streamline the worksheet formulating operation. Further, human errors are liable to occur in the worksheet formulating operation, causing a serious accident.

In view of the foregoing, it is an object of the present invention to provide a machining-related information generating apparatus which can speedily and correctly generate tool path data on the basis of CAD data and automatically generate machining-related information required for actual machining, and to provide a numerical controller having the machining-related information generating apparatus.

SUMMARY OF THE INVENTION

In accordance with the present invention to achieve the aforesaid object, there is provided a machining-related information generating apparatus, which automatically generates machining-related information including tool path data indicative of tool traveling paths and cutting conditions and other machining-related data to be used in an NC machine tool, the apparatus comprising: a process/machining model data generating section which extracts at least characteristic data indicative of three-dimensional configurational characteristics of a product from product configuration data generated by CAD, then generates process data indicative of machining processes and machining areas for the respective machining processes on the basis of the extracted characteristic data, and generates stock blank data indicative of a configuration of a stock blank and machining model data indicative of machining models for the respective machining processes; process/machining model data storage section for storing therein the characteristic data, the process data, the stock blank data and the machining model data prepared by the process/machining model data generating section; tool database storing therein tool data related to tools; machining condition database storing therein machining condition data indicative of cutting conditions according to stock blank materials and tool materials and machining methods according to characteristic configurations; a machining-related information generating section which generates tool path data indicative of tools to be used in the respective machining processes, cutting conditions to be employed in the respective machining processes, machining methods to be employed in the respective machining processes and tool traveling paths to be employed in the respective machining processes on the basis of the process data, the stock blank data and the machining model data stored in the process/machining model data storage section, the tool data stored in the tool database and the machining condition data stored in the machining condition database, then generates virtual workpiece configuration data indicative of workpiece configurations to be obtained after completion of the respective machining processes, and generates machining operation information data indicative of machining operation information on the basis of the process data, the stock blank data, the tool path data and the virtual workpiece configuration data; machining-related information storage section for storing therein the data generated by the machining-related information generating section; and output means for outputting the data stored in the machining-related information storage section to the outside.

In the machining-related information generating apparatus according to the present invention, the process/machining model data generating section extracts only the configuration data required for the generation of the tool path data from product design data generated by the CAD by excluding data such as indicative of dimension lines unnecessary for the generation of the tool path data, and then extracts at least the characteristic data indicative of the three-dimensional configurational characteristics of the product from the extracted configuration data. The three-dimensional configurational characteristics herein indicate how the product is three-dimensionally configured, e.g., whether the product has a round portion, a rectangular portion, a cylindrical portion, a prismatic portion, a convex surface or a concave surface.

Then, the process data indicative of the machining processes and the machining areas for the respective machining processes are generated on the basis of the extracted characteristic data. More specifically, the machining areas are defined as corresponding to the respective characteristic configurations, and then machining processes (e.g., rough machining, semi-finish machining or finish machining) are assigned to the respective machining areas. Alternatively, areas to be subjected to machining with the use of the same tool are regarded as a single machining area, and a machining process (e.g., rough machining, semi-finish machining or finish machining) is assigned to the machining area. The stock blank data indicative of the stock blank configuration and the machining model data indicative of the machining model configurations after completion of the respective machining processes are generated on the basis of the configuration data of the product. For determination of the stock blank configuration and the machining model configurations, finishing allowances in the respective machining processes are sequentially offset from a final product configuration. The characteristic data, the process data, the stock blank data and the machining model data are stored in the process/machining model data storage section.

The machining-related information generating section generates the tool path data indicative of the tools to be used in the respective machining processes, the cutting conditions to be employed in the respective machining processes, the machining methods to be employed in the respective machining processes, the tool traveling paths to be employed in the respective machining processes on the basis of the process data, the stock blank data and the machining model data stored in the process/machining model data storage section, and the tool data stored in the tool database and the machining condition data stored in the machining condition database. The machining methods are herein intended to include machining modes such as contour line machining, scanning line machining, circular interpolation, linear interpolation and cutting directions, a feed pitch for repetitive machining in a predetermined machining cycle, and a machining sequence for machining in the respective machining areas.

Further, the virtual workpiece configuration data indicative of the workpiece configurations to be obtained after the completion of the respective machining processes are generated, and the machining operation information data indicative of the machining operation information is generated on the basis of the process data and the stock blank data generated in the process/machining model data generating section, the tool path data and the virtual workpiece configuration data. The machining operation information is herein intended to include at least one of tool information required for a preparatory operation, information indicative of use of a cutting fluid, and machining-related information such as cutting conditions, estimated machining times, tool wear amounts, tool life expectancies, and a workpiece configuration to be obtained after completion of machining.

The tool path data and the machining operation information data thus generated are stored as the machining-related information in the machining-related information storage section and, as required, outputted to the outside on an image basis or a text basis in a displayed form or a printed form, or on an electronic data basis.

In accordance with the present invention, there is no need for an operator to input the data of the characteristic configurations of the product and the data of the machining methods indicative of the to-be-used tools and the cutting conditions for the generation of the tool path data, so that the data input time is obviated. Therefore, the tool path data can speedily be generated, thereby effectively speeding up the machining of the product. Further, human errors in the data input can be eliminated, thereby preventing production of defective products and damages to jigs and tools which may otherwise occur due to the input errors. The effect of the present invention is particularly remarkable in the case of machining for production of a uniquely customized product such as a mold.

The tool path data is herein intended to include data such as of tool traveling paths, tool rotation speeds and tool feeding speeds required for operating the NC machine tool, and means data which serves as a base for generating motion data required for executing an NC machining program and for directly driving a servo mechanism of the NC machine tool.

Since the machining-related information including the information required for the preparatory operation for the machining can automatically be generated, human errors in a worksheet formulating operation can be prevented to streamline the worksheet formulating operation. By utilizing the machining-related information thus generated, the preparatory operation for the machining can easily be performed in a shorter time. Further, a machining time can be estimated, so that an optimum time slot (daytime or nighttime) can be selected for the machining. If a machining operation is expected to be completed in a short time, the machining operation may be performed during an operator-attended operation period and, after the completion of the machining operation, the operator can perform the next workpiece machining operation or the next preparatory operation. Thus, the productivity can be improved. On the other hand, if a machining operation is expected to require much time, the machining operation may be performed during a nighttime non-attended operation period. Further, the number of the tools required for the machining and the machining time can be estimated, thereby making it possible to preliminarily calculate costs for the machining of the workpiece. Therefore, cost estimation can promptly be provided.

The machining-related information generating apparatus may further comprise an NC machining program generating section which converts the tool path data generated by the machining-related information generating section into an NC machining program, which is in turn outputted to the outside. The machining-related information generating apparatus may further comprise a motion data generating section which converts the tool path data into motion data, which is in turn outputted to the outside. With this arrangement, the machining program and the motion data thus generated can directly be inputted on-line to a numerical controller of the NC machine tool, or inputted to the numerical controller with the use of a recording medium such as a floppy disk. Thus, the generation of the tool path data can be carried out with no link-up to the NC machine tool, i.e., on an off-line basis, so that the utilization factor of the NC machine tool can be increased. The motion data herein means data required for directly driving the servo mechanism of the NC machine tool.

The tool path data thus generated may immediately be implemented and processed for the machining.

BRIEF DESCRIPTION OF THE DRAWINGS

FIGS. 9 to 17 are diagrams illustrating exemplary machining-related information to be generated by the machining-related information generating section according to the embodiment.

DESCRIPTION OF THE PREFERRED EMBODIMENT

Figure 1:
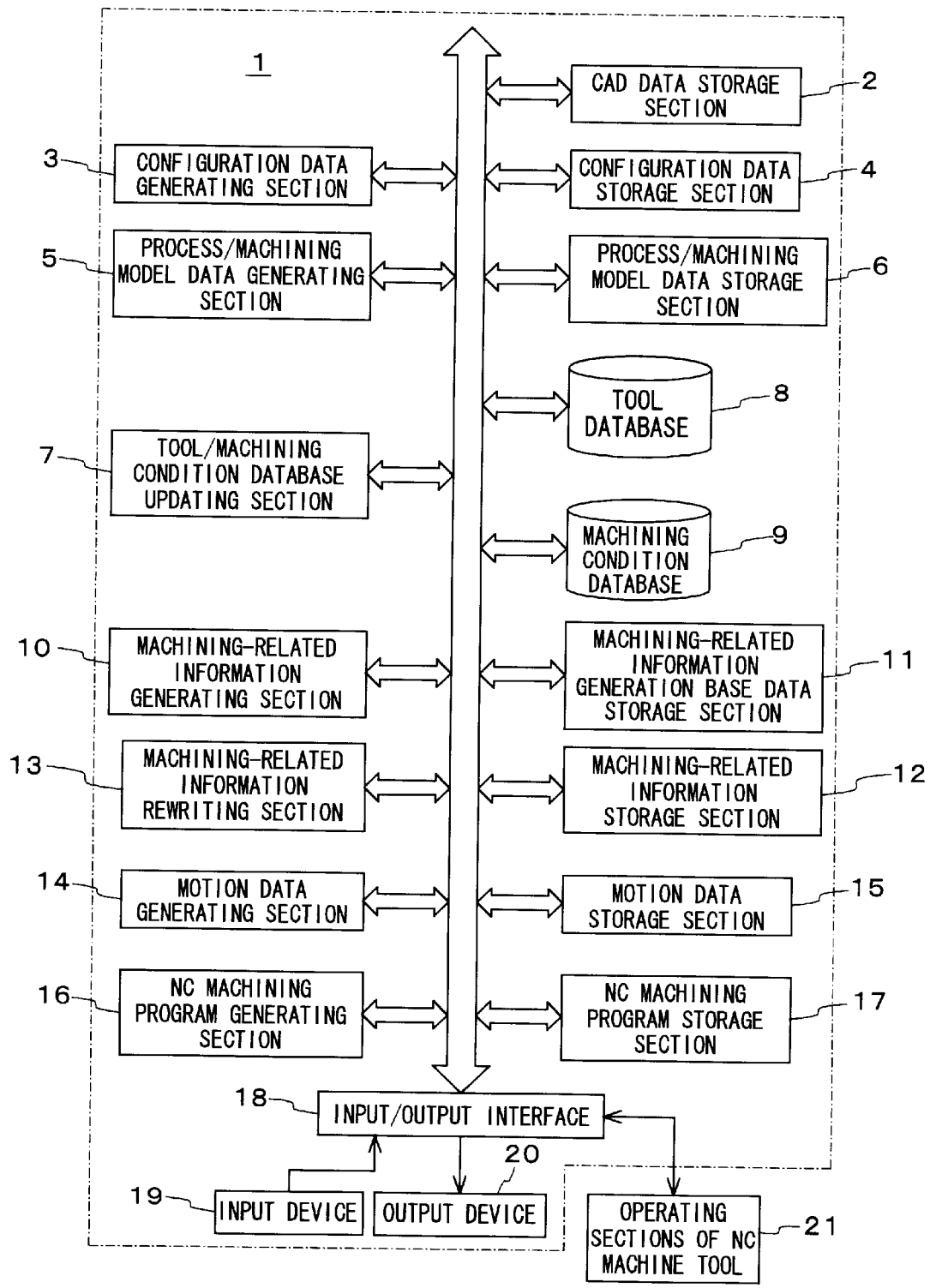
FIG. 1 is a block diagram illustrating the major construction of a numerical controller according to one embodiment of the present invention.

With reference to the attached drawings, the present invention will hereinafter be described by way of a specific embodiment thereof. FIG. 1 is a block diagram illustrating the major construction of a numerical controller according to the embodiment of the present invention.

As shown, the numerical controller 1 according to this embodiment includes processing sections such as a configuration data generating section 3, a process/machining model data generating section 5, a tool/machining condition database updating section 7, a machining-related information generating section 10, a machining-related information rewriting section 13, a motion data generating section 14 and an NC machining program generating section 16, storage sections such as a CAD data storage section 2, a configuration data storage section 4, a process/machining model data storage section 6, a tool database 8, a machining condition database 9, a machining-related information generation base data storage section 11, a machining-related information storage section 12, a motion data storage section 15 and an NC machining program storage section 17, and an input/output interface 18, which are interconnected via bus lines, and an input device 19 and an output device 20 connected to the input/output interface 18. Operating sections 21 of an NC machine tool as external devices are connected to the input/output interface 18. The respective components of the numerical controller 1 will hereinafter be described in detail.

The CAD data storage section 2 stores therein CAD data of a product inputted from the input device 19 on an on-line basis or from a recording medium such as a floppy disk. The CAD data is prepared by means of a device separate from the numerical controller 1 of this embodiment, and includes design data indicative of the final configuration and dimensions of the product obtained after machining, for example, coordinates data and mathematical expression data for the product configuration, and data of a surface finish accuracy, a stock blank material and a stock blank configuration. The CAD data generally includes data unnecessary for generation of tool path data, e.g., data of dimension lines.

Figure 4:
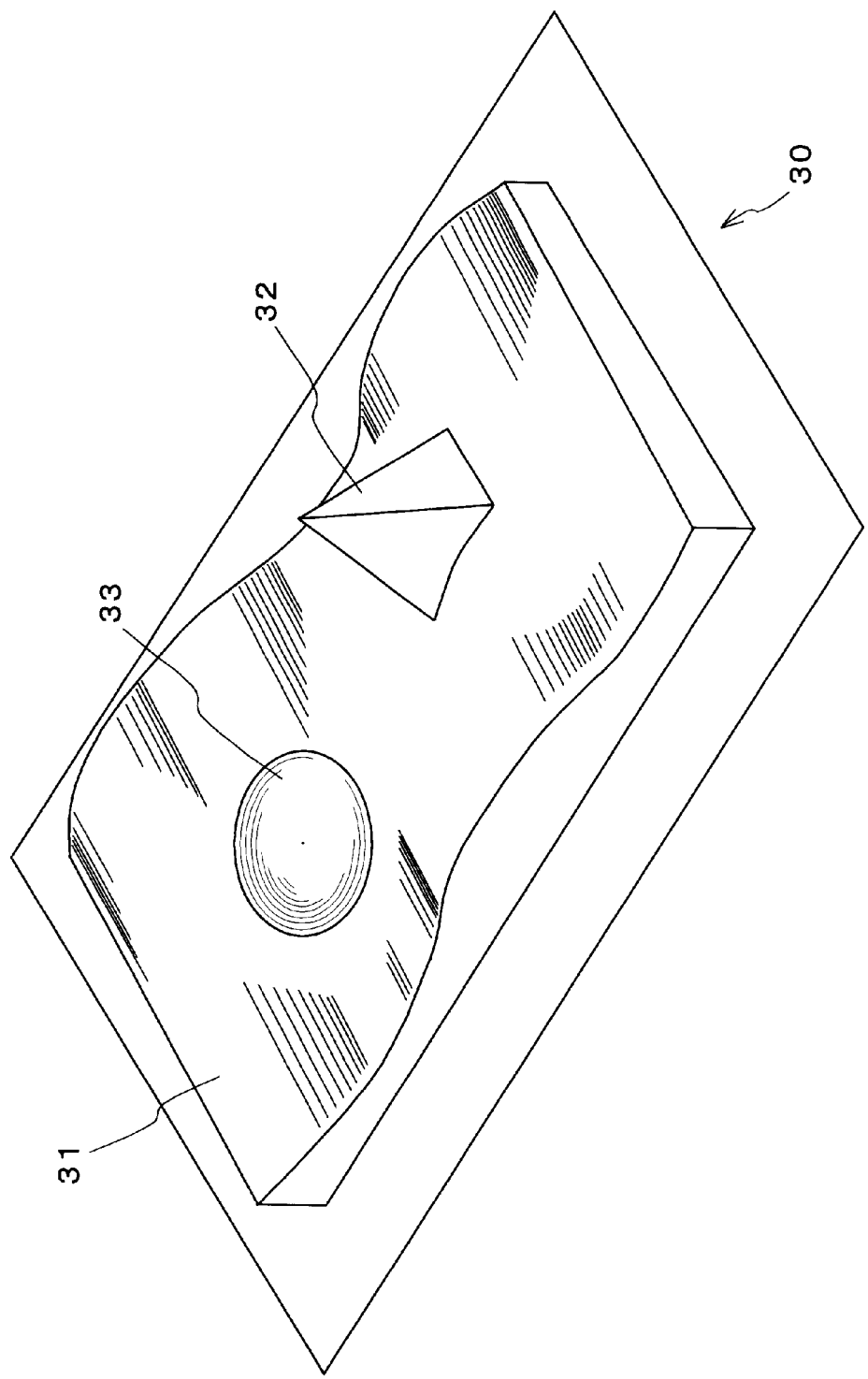
FIG. 4 is a diagram for explaining a process to be performed by a configuration data generating section according to the embodiment.

The configuration data generating section 3 extracts only data (e.g., configuration data) necessary for the generation of the tool path data from the CAD data stored in the CAD data storage section 2 by excluding data (e.g., dimension line data) unnecessary for the generation of the tool path data. The configuration data extracted by the configuration data generating section 3 is stored in the configuration data storage section 4. FIG. 4 shows an exemplary product configuration to be displayed in a visual form on the basis of the configuration data stored in the configuration data storage section 4. As shown, the product (workpiece) 30 has an undulated surface 31 (free-form surface), a projection (pyramid) 32 provided on the undulated surface 31, and a recess 33.

Figure 2:
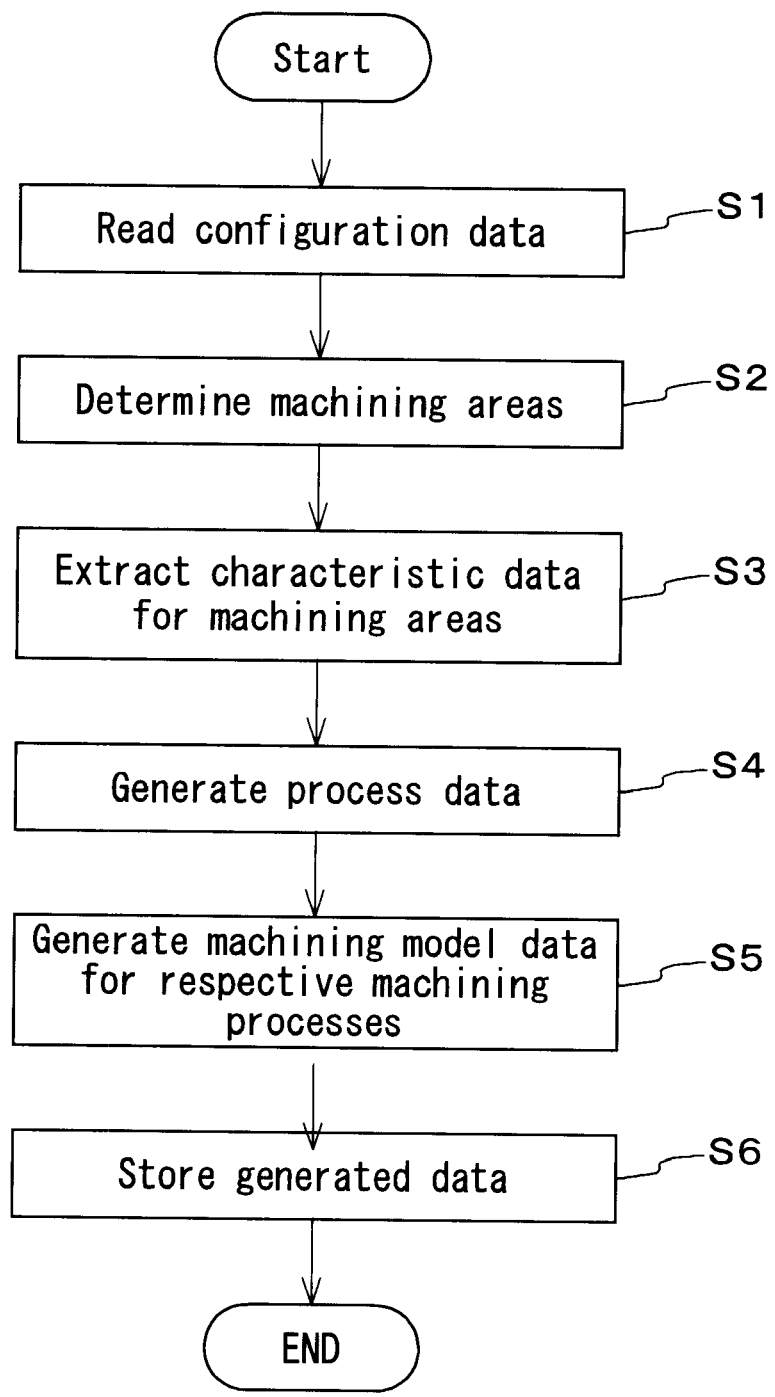
FIG. 2 is a flow chart for explaining a process to be performed by a process/machining model data generating section according to the embodiment.

The process/machining model data generating section 5 performs a process shown in FIG. 2. More specifically, the process/machining model data generating section 5 reads the configuration data out of the configuration data storage section 4 (Step S1), and picks out machining areas to be subjected to machining from areas specified by the configuration data (Step S2).

Then, three-dimensional configurational characteristics of the product in the machining areas are extracted for generation of characteristic data (Step S3). This characteristic extracting operation includes two operations: a simple configuration extracting operation which is a relatively simple operation for extracting relatively simple configurational elements such as a cylindrical shape and a prismatic shape in the machining areas directly extracted from the configuration data; and free-form surface characteristic configuration extracting operation which is a relatively complex operation for extracting characteristic configurations such as free-form surfaces in the machining areas which cannot directly be extracted from the configuration data.

Figure 5:
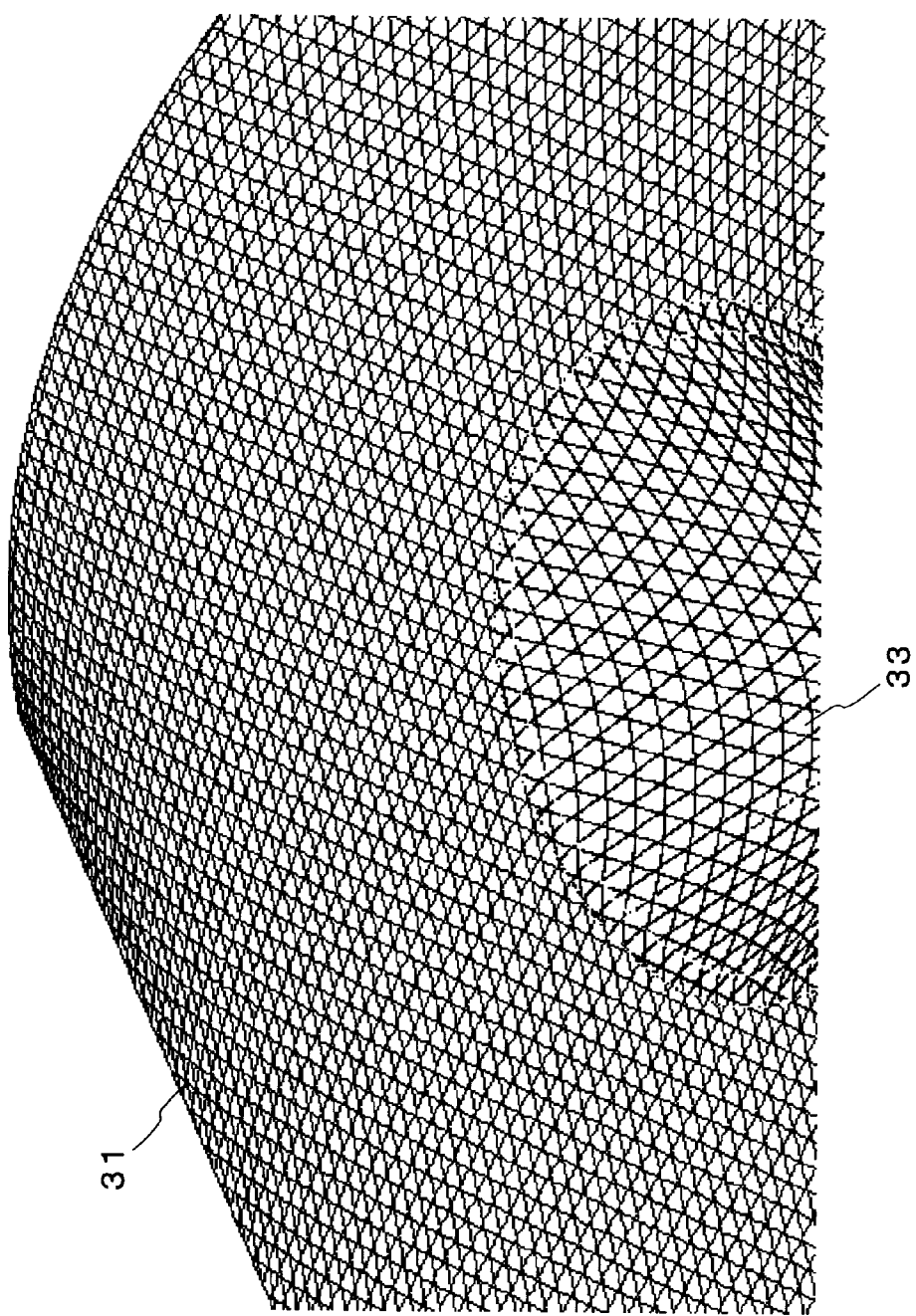
FIGS. 5 to 8 are diagrams for explaining a characteristic extracting process to be performed by the process/machining model data generating section according to the embodiment.

More specifically, the free-form surface characteristic configuration extracting operation is performed by an area projection method in this embodiment. In the extracting operation employing the area projection method, a virtual image constituted by a multiplicity of minute triangles are projected onto a workpiece surface obtained on the basis of the configuration data as shown in FIG. 5. Then, normal lines are defined on the workpiece surface as extending from the respective minute triangular images formed on the workpiece surface, and the directions of the normal lines are analyzed for the extraction of the configurational characteristics in the machining areas. FIG. 5 illustrates the virtual image projected on the workpiece 30 of FIG. 4.

Figure 6:
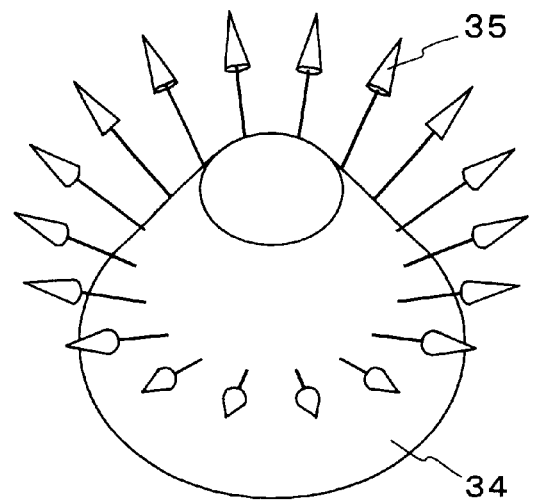
Figure 7:
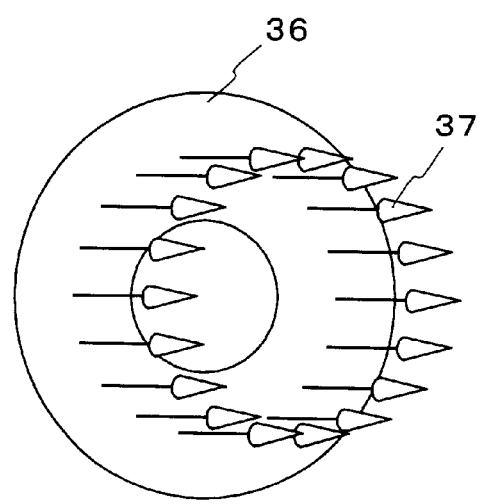
Figure 8:
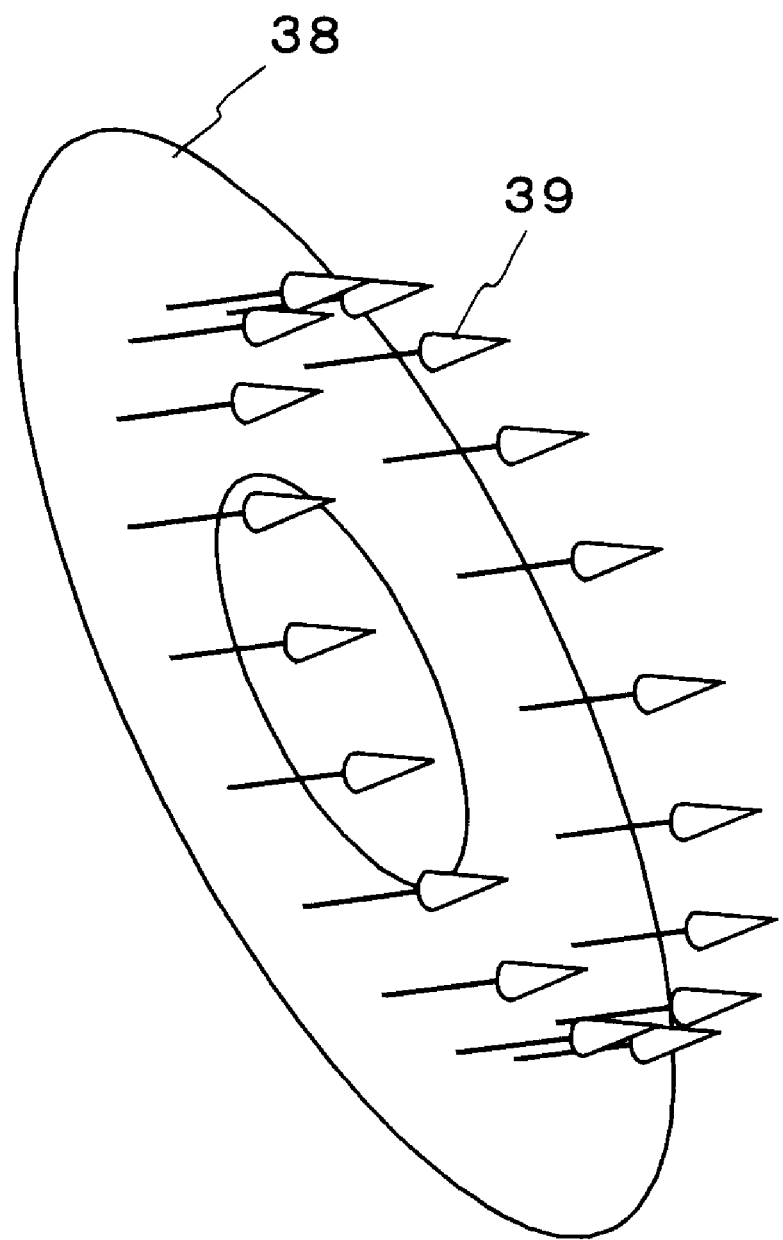

In the case of a truncated-conical portion 34 as shown in FIG. 6, normal lines 35 radially extend therefrom with no intersection. In the case of a vertical surface portion 36 as shown in FIG. 7, normal lines 37 extend therefrom parallel to each other. In the case of an inclined surface portion 38 as shown in FIG. 8, normal lines 39 extend therefrom at a certain angle with respect to the direction of the image projection. In the case of a concave portion, normal lines intersect with each other though not shown. Thus, the characteristic configurations in the machining areas can be determined by analyzing the directions of the normal lines. In the free-form surface characteristic configuration extracting operation, the characteristic configurations can be extracted in this manner.

On the basis of the characteristic data thus generated, process data is generated which is indicative of machining processes and machining areas for the respective machining processes (Step S4). In this operation, the machining areas are defined as corresponding to the respective characteristic configurations, and then machining processes (e.g., rough machining, semi-finish machining and finish machining) are assigned to the respective machining areas. Alternatively, areas which can be subjected to machining with the use of the same tool are regarded as a single machining area, and a machining process (e.g., rough machining, semi-finish machining or finish machining) is assigned to the machining area.

Then, stock blank data indicative of a stock blank configuration and machining model data indicative of machining model configurations to be obtained after completion of the respective machining processes are generated on the basis of the product configuration data (Step S5). The characteristic data, the process data, the stock blank data and the machining model data thus generated are stored in the process/machining model data storage section 6 (Step S6). Thus, the process/machining model data generating section 5 completes the process.

The tool database 8 stores therein tool information including data indicative of the types (models, materials and the like) of tools and tool holders, dimensional data indicative of the diameters and lengths of the tools, and image data of the tools and the holders. The machining condition database 9 stores therein machining condition data indicative of machining modes (e.g., machining methods such as contour line machining, scanning line machining, linear interpolation, circular interpolation and method for air-cut avoidance) according to characteristic configurations, cutting speeds preset for the respective tool types according to stock blank materials, cutting amounts for each turn of the tools and cutting allowances. The machining condition data is inputted from the input device 19.

The machining-related information generating section 10 generates tool path data and machining-related information on the basis of the characteristic data, the process data, the stock blank data and the machining model data stored in the process/machining model data storage section 6, the tool data stored in the tool database 8, and the machining condition data stored in the machining condition database 9.

Figure 3:
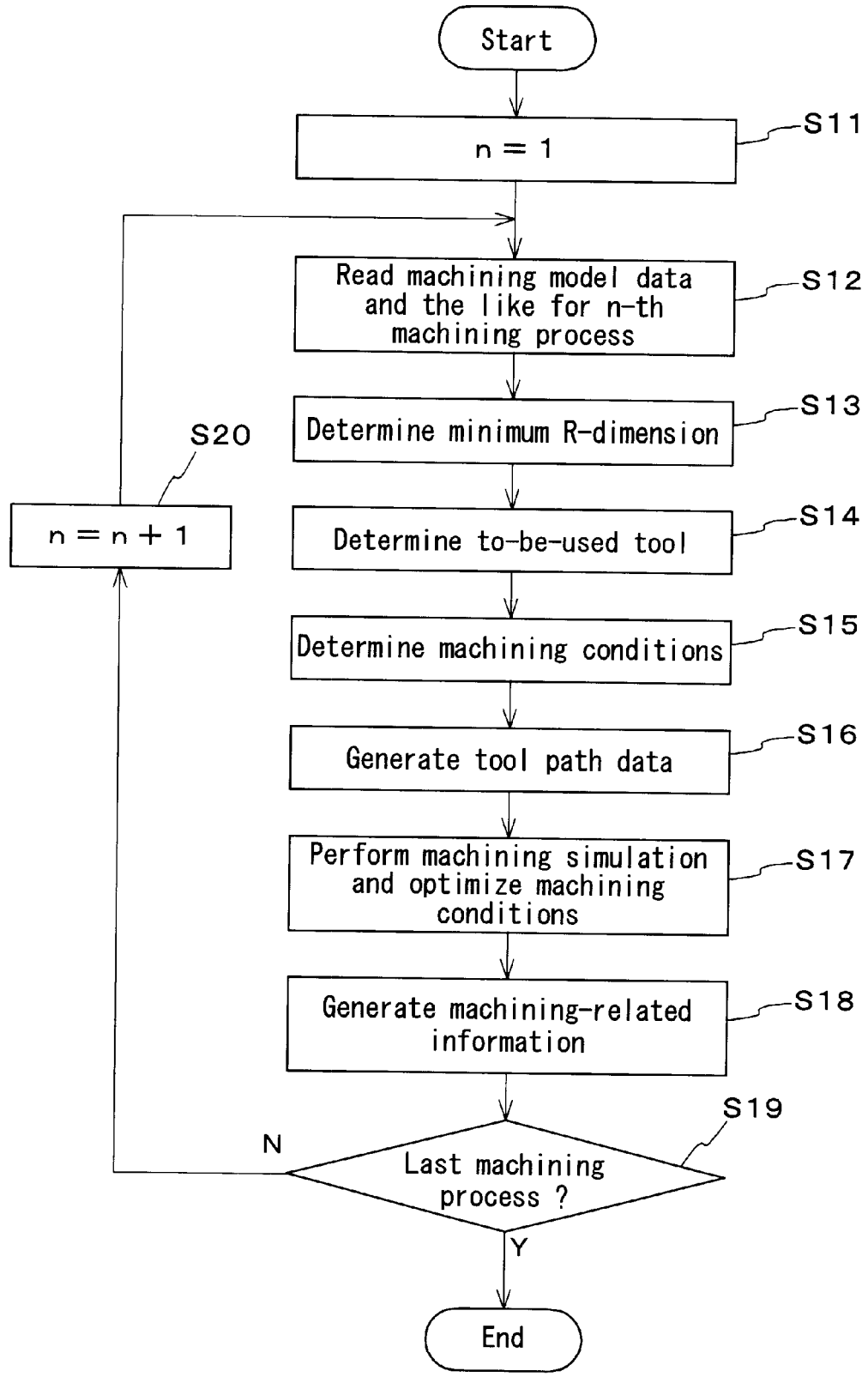
FIG. 3 is a flow chart for explaining a process to be performed by a machining-related information generating section according to the embodiment.

More specifically, the machining-related information generating section 10 performs a process as shown in FIG. 3. A counter n is initialized (n=1) in Step S11. Then, characteristic data, process data, pre-machining model data (the stock blank data for the first machining process) and post-machining model data for an n-th machining process are read out of the process/machining model data storage section 6 in Step S12.

The machining model data thus read is analyzed to extract R-dimensions (radii) of round corner portions defined between adjacent pairs of faces of the product, and the minimum one of the R-dimensions is selected (Step S13). A tool diameter (which is not greater than the minimum R-dimension) usable in the machining process is determined on the basis of the minimum R-dimension, and then the tool database 8 is searched to determine a tool (including a tool holder) to be used in the machining process on the basis of the tool diameter thus determined and other dimensional data (e.g., the depth of a hole in the case of drilling) obtained from the machining model data. To-be-used tool data indicative of the to-be-used tool thus determined is stored for each of the machining processes in the machining-related information generation base data storage section 11 (Step S14).

Then, machining condition database 9 is searched to determine machining conditions for the machining process on the basis of the to-be-used tool data, the characteristic data, the process data and the stock blank data. Machining condition data indicative of the machining conditions thus determined is stored for each of the machining processes in the machining-related information generation base data storage section 11 (Step S15). On the basis of the characteristic data, an optimum machining mode, cutting conditions and the like for each of the machining areas are determined and, where a machining cycle is repeatedly performed in the machining process, a feed pitch is determined on the basis of a finish surface roughness and the like. Where the same tool is used for machining in a plurality of machining areas, a sequence of machining operations to be performed in the respective machining areas is determined so that the machining operations can sequentially be performed in the machining areas in consideration of a machining efficiency.

The tool path data which includes data indicative of tool traveling paths, tool rotation speeds and tool traveling speeds is generated for the respective machining areas in accordance with the machining sequence on the basis of the to-be-used tool data, the characteristic data, the process data, the stock blank data and the machining model data. The tool path data thus generated is stored for each of the machining processes in the machining-related information generation base data storage section 11 (Step S16).

A machining simulation is performed on the basis of the tool path data thus generated to optimize the machining conditions, and workpiece configuration data indicative of a workpiece configuration (virtual workpiece configuration) obtained after completion of the machining process in the simulation is stored for each of the machining processes in the machining-related information generation base data storage section 11 (Step S17). The stock blank data indicative of the stock blank configuration is also stored in the machining-related information generation base data storage section 11.

On the basis of the data generated in the aforesaid manner and stored in the machining-related information generation base data storage section 11, the amount of the wear of the tool, the time expected to lapse until the tool reaches a wear limit, the time expected to be required for a preparatory operation for the machining, the time expected to be required for the machining, and a machining cost estimated for the machining process are calculated, and machining operation information data indicative of machining operation information including the estimation, the workpiece configurations (image-based information) before and after the machining process and set-up information (model and image-based information) is generated. The machining operation information data thus generated and the tool path data are stored as machining-related information in the machining-related information storage section 12 (Step S18).

The machining-related information generating section 10 performs the aforesaid process for the respective machining processes to generate the aforesaid data for the respective machining processes, and the machining-related information is stored for the respective machining processes in the machining-related information storage section 12 (Steps S19, S20). Thus, the machining-related information generating section 10 completes the process.

Exemplary machining-related information to be generated by the machining-related information generating section 10 is shown in FIGS. 9 to 17. FIGS. 9 to 11 each show tool set-up information (tool preparation information) for a machining process (e.g., a rough machining process, a semi-finish machining process or a finish machining process) in a table form, which includes workpiece images before and after the machining process, the types, makers, dimensions, images of a tool and a tool holder, a tool number and a offset number. FIGS. 12 to 16 each show machining condition information for a machining process in a table form, which includes a workpiece image after the machining process, a tool number, tool dimensions, cutting conditions, a machining method, a machining time and a tool wear amount. FIG. 17 shows in a table form the outline of the machining to be performed on the workpiece in the respective machining processes, which includes the workpiece images before and after the respective machining processes and machining operations to be performed in the respective machining processes. In view of such information, an operator can promptly and correctly understand the tools required for the respective machining processes, machining operations to be performed in the respective machining processes and the outline of the whole machining process.

The motion data generating section 14 generates motion data required for directly driving the servo mechanism and the like provided in the NC machine tool. More specifically, the motion data is generated on the basis of the tool path data stored in the machining-related information storage section 12. Then, the motion data thus generated is outputted to the operating sections 21 of the NC machine tool via the input/output interface 18, and stored in the motion data storage section 15. The operating sections 21 of the NC machine tool are driven on the basis of the motion data, whereby the workpiece is machined.

The machining-related information rewriting section 13 changes the data stored in the machining-related information storage section 12. This is achieved by receiving data inputted from the input device 19. When the machining-related information is changed, the data stored in the tool database 8 and the machining condition database 9 is updated with the changed data by the tool/machining condition database updating section 7. With the data updating function, knowledge obtained by the actual machining can be reflected on the next machining. That is, a so-called learning function can be provided. The tool/machining condition database updating section 7 is also adapted to receive data inputted from the input device 19, and update the data stored in the tool database 8 and the machining condition database 9 with the inputted data.

In this embodiment, the NC machining program generating section 16 is provided for generating an NC machining program on the basis of the tool path data generated in the aforesaid manner. The NC machining program generating section 16 generates a commonly used NC machining program (e.g., in an ISO format) on the basis of the tool path data stored in the machining-related information storage section 12, and stores the generated NC machining program in the NC machining program storage section 17.

The output device 20 includes a display device, a printing device and a device for storing data in a recording medium such as a floppy disk. The data stored in the CAD data storage section 2, the configuration data storage section 4, the process/machining model data storage section 6, the tool database 8, the machining condition database 9, the machining-related information generation base data storage section 11, the machining-related information storage section 12, the motion data storage section 15 and the NC machining program storage section 17 can be displayed on the display device, printed out by the printing device, and stored in the recording medium (e.g., floppy disk). After the data stored in the machining-related information storage section 12 is displayed on the display device or printed out by the printing device, the operator can analyze the data for the correction of the data. Since the NC machining program can be stored in the recording medium, the NC machining program can be transported to a second NC machine tool via the recording medium for execution thereof on the second NC machine tool.

As detailed above, the numerical controller 1 according to this embodiment obviates the need for the operator to input the data of the characteristic configurations of the workpiece and the data of the machining methods indicative of the to-be-used tools and the cutting conditions, so that the data input time is obviated. Therefore, the tool path data can speedily be generated, thereby effectively speeding up the workpiece machining. In addition, human errors in the data input can be eliminated, thereby preventing production of defective workpieces and damages to jigs and tools which may otherwise occur due to the input errors. The numerical controller is particularly advantageous in the case of machining for production of a uniquely customized product such as a mold.

Further, the machining-related information including information required for the preparatory operation for the machining can automatically be generated, so that human errors in a worksheet formulating operation can be prevented to streamline the worksheet formulating operation. By utilizing the machining-related information thus generated, the preparatory operation for the machining can easily be performed in a shorter time. Further, the machining time can preliminarily be estimated, so that an optimum time slot (daytime or nighttime) can be selected for the machining. If a machining operation is expected to be completed in a short time, the machining operation may be performed during an operator-attended operation period and, after the completion of the machining operation, the operator may perform the next workpiece machining operation or the next preparatory operation. Thus, the productivity can be improved. On the other hand, if a machining operation is expected to require much time, the machining operation may be performed during a nighttime non-attended operation period. Further, the number of tools required for the machining and the machining time can be estimated, making it possible to preliminarily calculate the costs for the machining of the workpiece. Therefore, cost estimation can promptly be provided.

While the present invention has thus been described by way of the embodiment thereof, it should be understood that the invention is not limited to the embodiment. Although the machining-related information generating apparatus including the processing sections such as the configuration data generating section 3, the process/machining model data generating section 5, the tool/machining condition database updating section 7, the machining-related information generating section 10, the machining-related information rewriting section 13, the motion data generating section 14 and the NC machining program generating section 16, and storage sections such as the CAD data storage section 2, the configuration data storage section 4, the process/machining model data storage section 6, the tool database 8, the machining condition database 9, the machining-related information generation base data storage section 11, the machining-related information storage section 12, the motion data storage section 15 and the NC machining program storage section 17 is incorporated in the numerical controller 1 of the NC machine tool in the embodiment described above, the machining-related information generating apparatus may be provided as a stand-alone apparatus separate from the numerical controller 1. In this case, the input/output interface 18, and the input device 19 and the output device 20 connected to the input/output interface 18 are preferably provided in the machining-related information generating apparatus.

What is claimed is:

1. A machining-related information generating apparatus, which automatically generates machining-related information including tool path data indicative of tool traveling paths and cutting conditions and other machining-related data to be used in an NC machine tool, the apparatus comprising:

a process/machining model data generating section which extracts at least characteristic data indicative of three-dimensional configurational characteristics of a product from product configuration data generated by CAD, then generates process data indicative of machining processes and machining areas for the respective machining processes on the basis of the extracted characteristic data, and generates stock blank data indicative of a configuration of a stock blank and machining model data indicative of machining models for the respective machining processes;

process/machining model data storage section for storing therein the process data, the stock blank data and the machining model data generated by the process/machining model data generating section;

tool database storing therein tool data related to tools;

machining condition database storing therein machining condition data indicative of cutting conditions according to stock blank materials and tool materials and machining methods according to characteristic configurations;

a machining-related information generating section which generates tool path data indicative of tools to be used in the respective machining processes, cutting conditions to be employed in the respective machining processes, machining methods to be employed in the respective machining processes and tool traveling paths to be employed in the respective machining processes on the basis of the process data, the stock blank data and the machining model data stored in the process/machining model data storage section, the tool data stored in the tool database and the machining condition data stored in the machining condition database, then generates virtual workpiece configuration data indicative of workpiece configurations to be obtained after completion of the respective machining processes, and generates machining operation information data indicative of machining operation information, including at least one of tool information required for a preparatory operation, information indicative of use of a cutting fluid, cutting conditions, estimated machining times, tool wear amounts, tool life expectancies, and the workpiece configuration to be obtained after completion of machining, on the basis of the process data, the stock blank data, the tool path data and the virtual workpiece configuration data;

machining-related information storage section for storing therein the data generated by the machining-related information generating section; and output means for outputting the data stored in the machining-related information storage section to the outside.

2. A machining-related information generating apparatus as set forth in claim 1, further comprising:

an NC machining program generating section which generates an NC machining program on the basis of the tool path data generated by the machining-related information generating section, wherein the output means outputs the NC machining program generated by the NC machining program generating section to the outside.

3. A machining-related information generating apparatus as set forth in claim 1, further comprising:

a motion data generating section which generates motion data required for driving a servo mechanism of the NC machine tool on the basis of the tool path data generated by the machining-related information generating section, wherein the output means outputs the motion data generated by the motion data generating section to the outside.

4. A numerical controller for controlling an operation of an NC machine tool on the basis of tool path data indicative of tool traveling paths and cutting conditions, the controller comprising:

a machining-related information generating apparatus as recited in any of claims 1 to 3; and a process executing section which executes a process sequence on the basis of tool path data generated by the machining-related information generating section to control the operation of the NC machine tool.

* * * * *